United States Patent
Schmidt et al.

(10) Patent No.: US 8,161,284 B1
(45) Date of Patent: *Apr. 17, 2012

(54) SYSTEM, METHOD AND COMPUTER READABLE MEDIUM FOR MESSAGE AUTHENTICATION TO SUBSCRIBERS OF AN INTERNET SERVICE PROVIDER

(75) Inventors: Jonathan E. Schmidt, San Antonio, TX (US); John A. Murphy, San Antonio, TX (US); Henry M. Donzis, San Antonio, TX (US); Lewis T. Donzis, San Antonio, TX (US); Peter W. Baron, San Antonio, TX (US); Rodney D. Frey, San Antonio, TX (US)

(73) Assignee: Perftech, Inc., San Antonio, TX (US)

( * ) Notice: Subject to any disclaimer, the term of this patent is extended or adjusted under 35 U.S.C. 154(b) by 947 days.

This patent is subject to a terminal disclaimer.

(21) Appl. No.: 12/004,645

(22) Filed: Dec. 24, 2007

Related U.S. Application Data

(60) Provisional application No. 60/877,500, filed on Dec. 28, 2006.

(51) Int. Cl.
*H04L 9/32* (2006.01)

(52) U.S. Cl. ........ 713/171; 713/168; 713/170; 713/155; 709/225; 709/227; 709/228

(58) Field of Classification Search ................. None
See application file for complete search history.

(56) References Cited

U.S. PATENT DOCUMENTS 6,337,899 B1 * 1/2002 Alcendor et al. ........ 379/88.17

* cited by examiner

*Primary Examiner* — Pramila Parthasarathy

(57) ABSTRACT

An internet service provider (ISP) is configured to provide notification messages such as service updates to subscribers via redirected web pages. In order for the web pages to be treated as originating from the ISP, the ISP provides a shared secret in the browser message. The shared secret may be a secret not derivable by viruses or trojans in the subscriber computer, such as a MAC address of the subscriber modem.

25 Claims, 5 Drawing Sheets

SYSTEM, METHOD AND COMPUTER READABLE MEDIUM FOR MESSAGE AUTHENTICATION TO SUBSCRIBERS OF AN INTERNET SERVICE PROVIDER

CROSS REFERENCE TO RELATED APPLICATIONS

The present patent application is related to and claims the benefit of provisional patent application No. 60/877,500, filed 28 Dec. 2006, titled "ABUSE SENTRY, AUDIT SENTRY, AUTHENTICATION ICON" the entire contents of which are incorporated by reference herein.

FIELD OF THE INVENTION

This disclosure relates to providing messages and notifications to subscribers of an Internet service provider (ISP) and in particular to providing authentication of messages and notifications.

BACKGROUND OF THE INVENTION

In the Applicant's earlier patent applications, U.S. Ser. No. 10/023,674 and U.S. Ser. No. 10/623,893, the entire contents of which are explicitly incorporated herein by reference, the present Applicants described networks in which communications could be provided from an ISP to a subscriber of the ISP. In the referenced applications, a redirection device was placed in the path of upstream traffic from the subscriber. The redirection device, operating under the control of a consolidating and management device elsewhere in the network, processed upstream data packets to determine when targeted communications to the subscriber were required. In particular examples provided in the applications referenced above, subscribers of an ISP attempting access to an internet service were provided with notification of potential internet service issues. A further application of providing communications to subscribers includes notifying subscribers of potential virus infections and e-mail spamming such as disclosed in the Applicant's co-filed patent application Ser. No. 12/004,634, the entire contents of which are explicitly incorporated herein by reference. A further application of providing communications to subscribers includes notifying subscribers of potential theft of internet service on an unsecured subscriber account, as described in the Applicant's co-filed patent application Ser. No. 12/004,634, the entire contents of which are explicitly incorporated herein by reference A problem with providing notifications to subscribers through redirected web pages as in the above referenced patent applications, is a tendency for such redirected web pages to have a similar look and feel to web pages that typically lead to virus and Trojan infection. Subscribers may therefore be unlikely to treat the redirected web pages as genuine. In particular, where the redirected web pages contain links to downloadable remedial facilities, as described in the patent applications referenced above, subscribers are unlikely to click through links where the links look like they potentially contain viruses.

What is a required is a system, method and computer readable medium for authenticating notifications and messages provided to subscribers in order to assure the subscriber that the message is, indeed, originating by the ISP.

SUMMARY OF THE INVENTION

In one embodiment of the disclosure, there is provided a method of authenticating an unsolicited notification from an ISP to a subscriber, the method comprising determining a subscriber identity; retrieving a shared secret associated with said subscriber identity from at least one database; generating a notification incorporating said shared secret; and displaying said notification to said subscriber.

In one embodiment of the disclosure, there is provided a network comprising at least one internet service provider that provides an internet connection for one or more subscriber accounts; and at least notification system comprising at least one database; and at least one query engine that executes one or more queries on said at least one database; wherein said notification system receives data received by said at least one internet service provider from said one or more subscribers; wherein said query engine executes a first query on said at least one database to determine a subscriber identity associated with said data; wherein said query engine executes a second query on said at least one database using said subscriber identity to retrieve a shared secret; wherein said notification system generates an unsolicited notification incorporating said shared secret; and wherein said Internet service provider provides said notification to a subscriber associated with said subscriber identity.

In one embodiment of the disclosure, there is provided an internet service provider comprising at least one router; and a packet processing engine; wherein said at least one router routes one or more data packets received by said router from a subscriber to said packet processing engine; wherein said packet processing engine determines a subscriber identity from said one or more packets; wherein said packet processing engine retrieves a shared secret associated with said subscriber identity; and wherein said packet processing engine redirects a URL page request from said subscriber to a URL page incorporating said shared secret.

In one embodiment of the disclosure, there is provided a method of providing a message from an Internet service provider to a subscriber comprising generating a notification event; generating an unsolicited message in response to said notification event; retrieving a shared secret stored in said internet service provider; incorporating said shared secret into said message; and displaying said message to said subscriber.

In one embodiment of the disclosure, there is provided a computer readable medium comprising instructions for receiving a request for web page content from a subscriber; retrieving a shared secret associated with said subscriber; providing said web page content to said subscriber; and providing said shared secret with said web page content.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
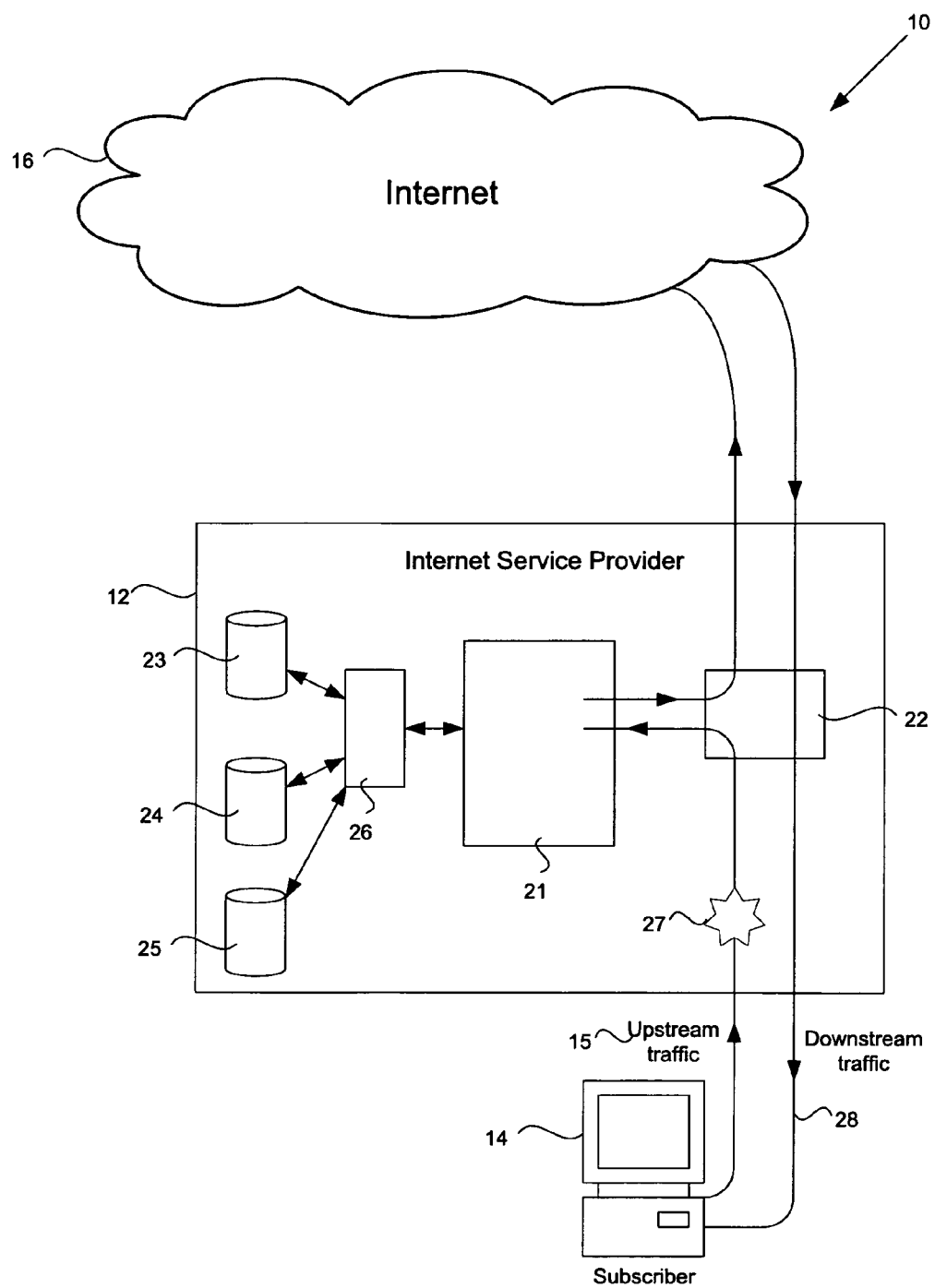
FIG. 1 schematically illustrates a network in accordance with an embodiment of the disclosure.

The present embodiments utilize many of the features and functionalities of the networks described in the Applicant's earlier patent applications referenced above. In FIG. 1, there is shown a system or network 10 in accordance with an embodiment of the disclosure. In the network 10, an ISP 12 provides a link between a subscriber device 14 and the internet 16. For the sake of clarity, in the following embodiments the subscriber device 14 will be referred to specifically as a personal computer, or PC. However, it will be readily understood by the person skilled in the art that the subscriber device 14 may be any Internet enabled device such as a personal computer (PC), laptop, palm device, mobile telephone, gaming console and the like, and all such internet enabled devices are to be considered equivalent.

The network 10 includes at least one redirection device 21 that is placed at the path of upstream traffic 15 from the subscriber 14, either in the path or in a position to monitor the path. As described in the above referenced patent applications, the redirection device 21 may be placed at many points within the network 10 and is optionally placed at an edge of the network that represents the last scaleable point in the operator's network. In one embodiment, the redirection device 21 is placed within the ISP 12. The term redirection device is used herein in order to provide consistency with the Applicant's earlier patent applications referenced above. The person skilled in the art will understand from the foregoing description that in the context of the present disclosure, the redirection device may not perform a redirection function in all embodiments.

The network 10 also includes a consolidating and management device 26, for example of the type as described in the Applicant's earlier applications referenced above. The consolidating and management device 26 is operatively associated with the redirection device 21 to form an authentication system, and more particularly a packet processing system, as will be described in greater detail below.

The ISP 12 includes a router or switch 22, a redirection device 21 as described above and an address provisioning database 23. The address provisioning database 23 stores associations between subscriber accounts of the ISP and IP addresses allocated to the subscribers. A second database 24 stores associations between subscribers of the ISP and shared secrets of the subscribers, as will be described below. The consolidating and management device 26 provides a query engine for accessing data from the databases 23, 24 in response to requests from the redirection device 21. A third database 25 may store pending notification information.

While three databases 23, 24, 25 are illustrated and described herein for clarity, the person skilled in the art will readily understand that the databases 23, 24, 25 can be consolidated into a single database or that the databases can be divided into a higher number of databases. For example, the databases 23, 24, 25 may be consolidated with a database for storing an association between a subscriber and an electronic mail sending profile of the subscriber, as described in the Applicant's co-pending application Ser. No. 12/004,634, referenced above. Alternatively or in addition, the databases 23, 24, 25 may be consolidated with a database for storing an association between a subscriber account and one or more users of the subscriber account, as described in the Applicant's co-pending application Ser. No. 12/004,634, referenced above.

Figure 6:
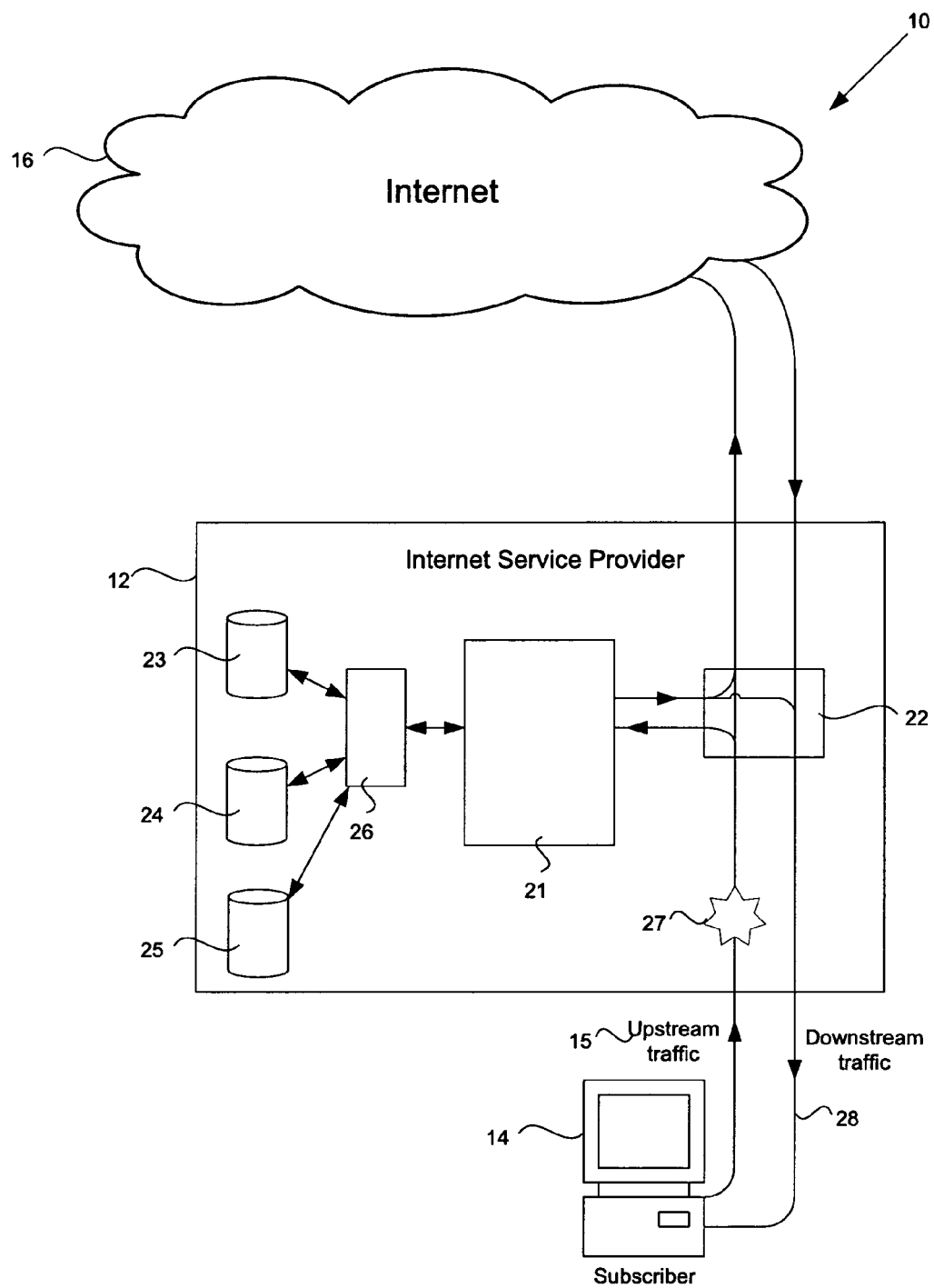
FIG. 6 represents an alternative network configuration.

Downstream traffic from the internet 16, indicated by path 28 is routed by the router 22 to the intended subscriber 14. Upstream traffic in the form of data packets 27 follow the path 15 from the subscriber 14 to be routed by the router 22 to the redirection device 21, thence back to the router 22 and onto the internet 16. In an alternative embodiment shown in FIG. 6, upstream traffic 15 passes directly through the Internet provider with the addition of a "mirror port" or "tap" allowing the redirector, 21, to monitor the upstream traffic.

Figure 2:
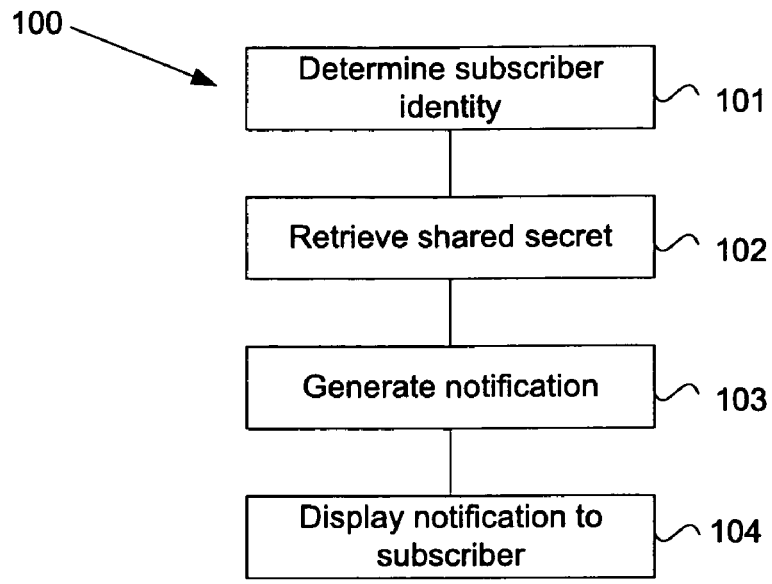
FIG. 2 represents a method for authenticating a message from an ISP to a subscriber.

The operation of the system 10 will now be described with reference to FIG. 1 and to the flowchart 100 illustrated in FIG. 2. Initially, data such as a URL page request is received from the subscriber 14 and a subscriber identity associated with the data message is identified at step 101. The system 10 then retrieves a shared secret (step 102), for example from database 24, and generates a notification message incorporating the shared secret (step 103). At step 104, the notification message incorporating the shared secret is provided to the subscriber.

Figure 3:
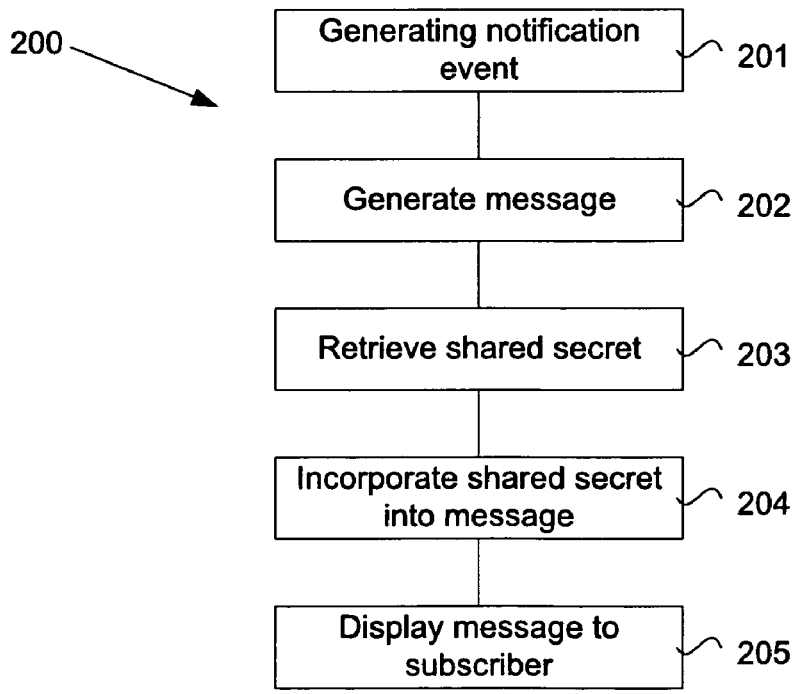
FIG. 3 represents a method for redirecting URL page requests to incorporate an authenticated message.

In one embodiment, the method steps described above are performed within the ISP as illustrated in the flowchart 200 of FIG. 3. Initially, data packets 27, such as URL page requests, originating at the subscriber are received in the ISP 12 and provided to the router 22. The router 22 passes selected packets, or in an alternative embodiment, copies of the packets, to the redirection device 21 for processing.

The redirection device 21 first analyzes the data packet 27 to retrieve an IP address of the data packet 27. The redirection device 21 forwards the IP address to the consolidation and management device 26, which executes a first query on the address provisioning database 23 to retrieve a subscriber identity associated with the IP address. At step 201, the redirection device 21 then determines if any notifications are required or pending for the subscriber, i.e. if any notification events have occurred, and if so, generates the appropriate message for the notification event (step 202). The redirection device 21 then executes a second query on the shared secret database 24 using the subscriber identity to retrieve the subscriber's shared secret (step 203). The shared secret is incorporated into the message (step 204) and then the message and the shared secret are displayed to the subscriber (step 205).

Figure 4:
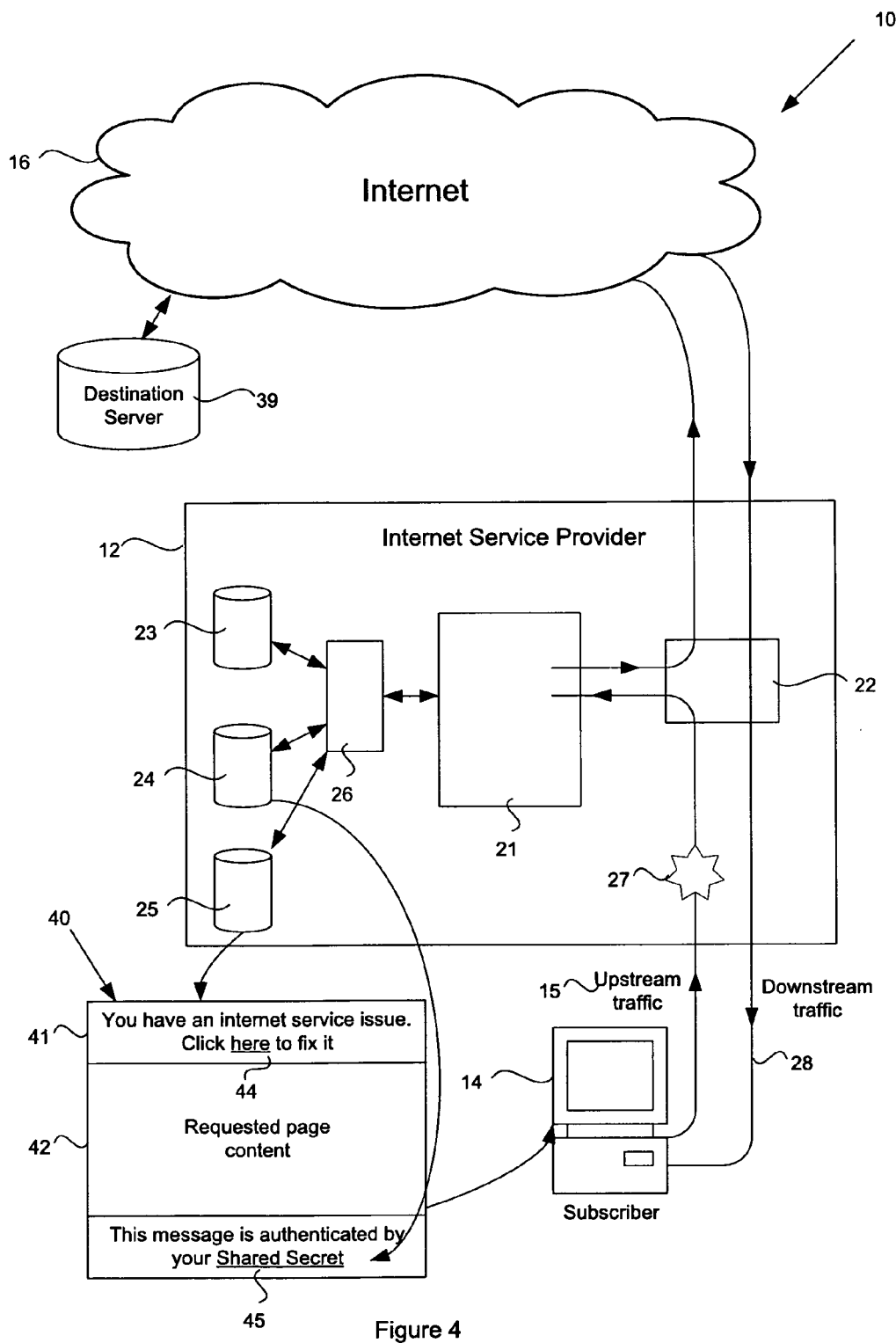
FIG. 4 schematically illustrates providing an authenticated web-browser message to a subscriber.

As described in the Applicant's earlier applications referenced above, subscriber notifications may be sent using web-browser messages. With reference to FIG. 4, when a notification is required a flag may be set in the notification database 25 that identifies the subscriber account as requiring a notification. For example, the notification flag may be set in response to notification events, such as internet service issues, detection of spam e-mailing originating from the subscriber's account, detection of excess users on the subscriber's account outside of a terms of service agreement, or for other notification events which may be apparent to the person skilled in the art.

The redirection device determines whether a notification is pending for a subscriber by executing a query, via the consolidating and management device 26, to the notification database 25 using the subscriber identity. If the query outcome determines that a notification is pending, the redirection device 21 provides to the subscriber an HTML redirection to destination server 39 that combines the destination URL in the page request and the URL for the message into a new page redirection for the subscriber's browser to fetch. In addition to the requested page content 42, the new page 40 includes a banner 41 or similarly visible message that indicates the message to the subscriber 14. Depending on the type of notification event being reported, the banner message 41 may indicate a hyperlink 44 to a downloadable facility for remedying the problem. In addition to the page content 42 and message 41, the page 40 incorporates the shared secret 45 retrieved from the shared secret database 24, to indicate to the user that the message is genuinely derived from the ISP.

It will be apparent to the person skilled in the art that notification events can occur and be reported spontaneously, i.e. without executing a query to the notification database. For example, a notification event can occur if the ISP detects that a current user of a subscriber's account is an excess user, as described in the applicant's co-pending application Ser. No. 12/004,634 referenced above.

Shared secrets may take any suitable form apparent to the person skilled in the art. In one embodiment, a shared secret such as a password or answer to a common question, may be provided by the subscriber, for example through a web-based form as is known. In one embodiment, the shared secret may be provided at the time the subscriber registers for the ISP service. In one embodiment, the shared secret may be derived from service details of the subscriber, such as a MAC address of the subscriber modem, since this cannot be derived by an in-computer virus nor from an external source without confidential information from the ISP. It is preferred that the shared secret by independently verifiable at both the subscriber end and the ISP end.

Figure 5:
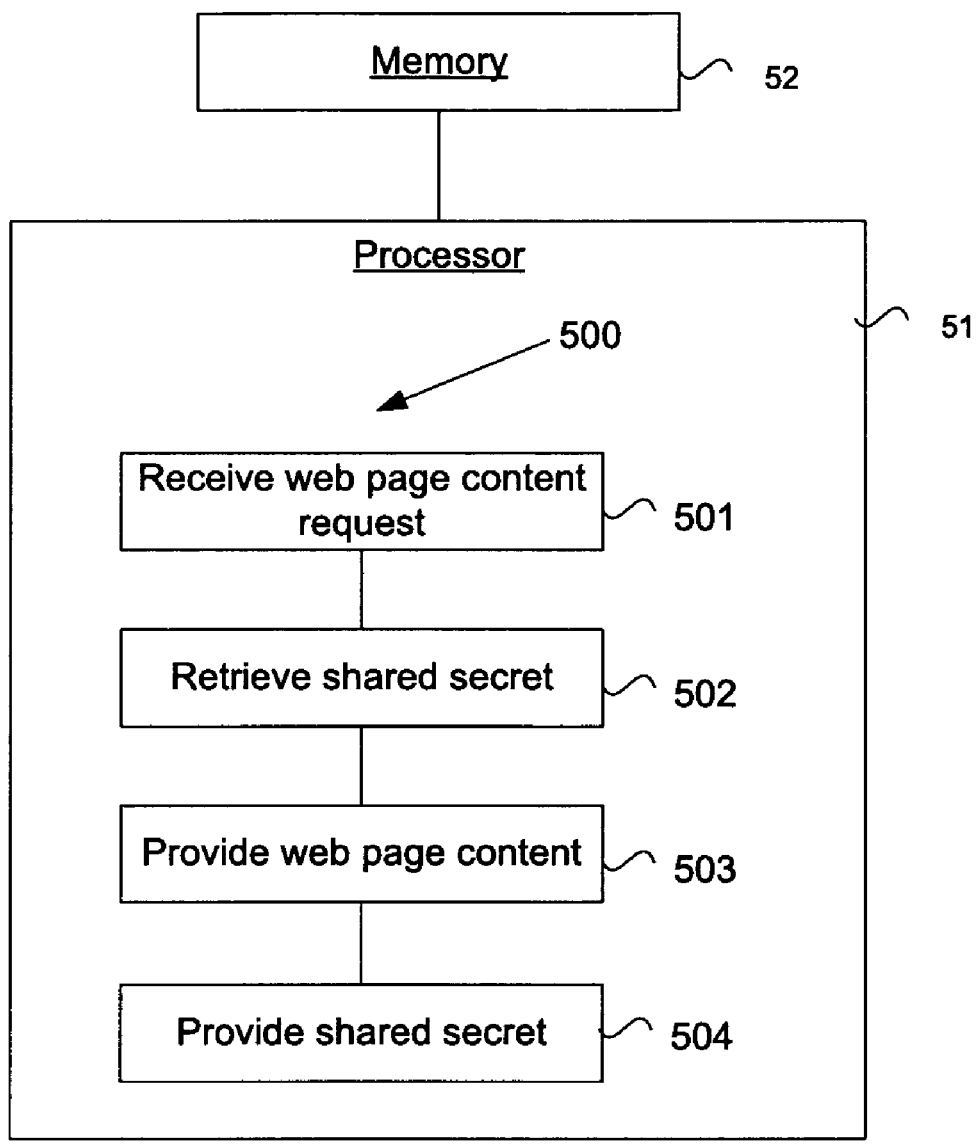
FIG. 5 represents a processor executing an instruction set for authenticating ISP messages.

In one embodiment depicted in FIG. 5, the ISP 12 includes at least one processor 51 operatively associated with at least one memory 52. The memory 52 stores an instruction set 500 executable on the processor 51. Executing the instructions causes the processor 51 to receive data from a subscriber account (501). The processor 51 then determines a number of users associated with the subscriber account (502) and compares the number of users with a threshold (503). The processor 51 then determines an action to be taken depending upon an outcome of the comparison (504). In one embodiment, the action taken may be any of the actions described previously.

The presently described embodiments demonstrate mechanisms that automatically authenticate ISP originating messages provided to subscribers of the ISP. By authenticating the messages, the subscribers are more likely to treat the messages as genuine, rather than as originating from a $3^{rd}$ party trying to "spoof" an ISP provided message with a look-alike format. Where the messages contain instructions and links for fixing subscriber issues, the subscriber is more likely to follow the instructions and undertake remedial actions, thereby improving the service for both the subscriber and the ISP.

An advantage of the embodiments herein described include that authenticating of messages can be performed using network devices that are relatively simple to install within the ISP and do not require all network traffic to pass through them. In particular, the redirection device 21 requires only read-only access to the data packets that it processes. A further advantage is that the embodiments may be implemented without updates being required to subscriber hardware or software and thus are instantly applicable across all subscribers to the ISP.

While one redirection device is shown within the ISP, the person skilled in the art will readily understand that any number of redirections devices may be provided for processing upstream data packets. In particular, separate redirection devices may be provided for separate channels within the ISP. Typically, a single consolidating and management device can be used to manage a plurality of redirections devices and to execute the queries to the databases. However, the person skilled in the art will readily understand that a plurality of consolidating and management devices may be employed.

While a single ISP has been described and illustrated, the person skilled in the art will readily understand that a plurality of ISPs may be provided that utilize a common authentication system or that each have an associated authentication system as described above.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of authenticating an unsolicited notification from an ISP to a subscriber, the method comprising:
   determining a subscriber identity;
   retrieving from a memory a shared secret associated with said subscriber identity from at least one database;
   generating a notification incorporating said shared secret via a processor;
   transmitting the notification to a subscriber device; and
   displaying said notification to said subscriber via the subscriber device to be authenticated by the subscriber, wherein the shared secret comprises at least one of a subscriber created information secret created by the subscriber and a subscriber device information secret based on a service detail identifier associated with the subscriber device.

2. The method according to claim 1 wherein determining a subscriber identity comprises determining an internet protocol (IP) address, and retrieving said subscriber identity from said at least one database using said IP address.

3. The method according to claim 1 further comprising receiving a uniform resource locator (URL) page request from a subscriber and determining said subscriber identity from said URL page request.

4. The method according to claim 3 further comprising determining if a notification is pending for said subscriber.

5. The method according to claim 4 wherein determining if a notification is pending for a subscriber comprises executing a query on said at least one database using said subscriber identity.

6. The method according to claim 5 further comprising generating a pending notification, associating said pending notification with said subscriber and storing said pending notification in said at least one database.

7. The method according to claim 3 further comprising generating said notification in response to receiving said URL page request.

8. The method according to claim 3 wherein providing said notification to said subscriber comprises redirecting said URL page request such that the subscriber retrieves a URL page comprising said notification.

9. The method according to claim 8 wherein said URL page comprises a hyperlink to a downloadable remedial facility.

10. A network comprising:
    at least one internet service provider that provides an internet connection for one or more subscriber accounts; and at least one notification system comprising:
at least one memory and corresponding database; and
at least one query engine that executes via a processor one or more queries on said at least one database;
wherein said notification system receives data received by said at least one internet service provider from said one or more subscribers;
wherein said query engine executes a first query on said at least one database to determine a subscriber identity associated with said data;
wherein said query engine executes a second query on said at least one database using said subscriber identity to retrieve a shared secret;
wherein said notification system generates an unsolicited notification incorporating said shared secret; and
wherein said internet service provider provides said notification to a subscriber associated with said subscriber identity by transmitting the notification to a subscriber device to be authenticated by the subscriber, wherein the shared secret comprises at least one of a subscriber created information secret created by the subscriber and a subscriber device information secret based on a service detail identifier associated with the subscriber device.

11. A network according to claim 10 wherein said data comprises at least one uniform resource locator (URL) page request and wherein said notification system redirects said URL page request to a URL page incorporating said notification.

12. A network according to claim 10 wherein said at least one database comprises a database associating a subscriber identity with a shared secret of a subscriber associated with said subscriber identity.

13. A network according to claim 12 wherein said shared secret comprises a MAC address of at least one subscriber device.

14. A network according to claim 13 wherein said at least one subscriber device comprises a modem.

15. An internet service provider comprising:
at least one router; and
a packet processing engine;
wherein said at least one router routes one or more data packets received by said router from a subscriber to said packet processing engine;
wherein said packet processing engine determines a subscriber identity from said one or more packets;
wherein said packet processing engine retrieves a shared secret associated with said subscriber identity; and
wherein said packet processing engine redirects a uniform resource locator (URL) page request from said subscriber to a URL page incorporating said shared secret and transmits the URL page including the shared secret to a subscriber device to be authenticated by the subscriber, wherein the shared secret comprises at least one of a subscriber created information secret created by the subscriber and a subscriber device information secret based on a service detail identifier associated with the subscriber device.

16. The internet service provider according to claim 15 wherein said router routes TCP SYN packets to said packet processing engine.

17. The internet service provider according to claim 16 wherein in response to receiving a TCP SYN packet said packet processing engine determines said subscriber identity from said TCP SYN packet determines if a notification event is current for said subscriber identity.

18. The internet service provider according to claim 17 further comprising at least one database that associates one or more notification events with one or more subscribers and wherein said packet processing engine executes a query on said at least one database to determine if a notification event is current for said subscriber.

19. The internet service provider according to claim 15 further comprising:
a query engine; and
at least one database;
wherein said packet processing engine:
retrieves an internet protocol (IP) address provided in said one or more data packets;
utilizes said query engine to retrieve said subscriber identity using said IP address from said at least one database; and
utilizes said query engine to retrieve said shared secret from said at least one database.

20. A method of providing a message from an internet service provider to a subscriber comprising:
generating via a processor a notification event;
generating an unsolicited message in response to said notification event;
retrieving a shared secret stored in a memory of said internet service provider;
incorporating said shared secret into said message;
transmitting the notification to a subscriber device to be authenticated by a subscriber; and
displaying said message to said subscriber, wherein the shared secret comprises at least one of a subscriber created information secret created by the subscriber and a subscriber device information secret based on a service detail identifier associated with the subscriber device.

21. The method according to claim 20 wherein generating said notification event comprises executing a query on at least one database of said internet service provider to determine if a message is pending for said subscriber.

22. The method according to claim 20 further comprising receiving data from said subscriber, wherein generating a notification event comprises determining a notification event from said data.

23. The method according to claim 20 wherein said notification event comprises one or more of an internet service notification, an email sending rate notification, and an excess user notification.

24. The method according to claim 20 wherein displaying said message to said subscriber comprises directing said subscriber to a web page comprising said message.

25. A non-transitory computer readable storage medium comprising instructions the when executed cause a processor to perform:
receiving a request for web page content from a subscriber;
retrieving a shared secret associated with said subscriber;
generating a notification incorporating said shared secret via a processor and incorporating the notification into the web page content; and
transmitting the web page content to a subscriber device to be authenticated by the subscriber, wherein the shared secret comprises at least one of a subscriber created information secret created by the subscriber and a subscriber device information secret based on a service detail identifier associated with the subscriber device.

* * * * *